Figure 1:
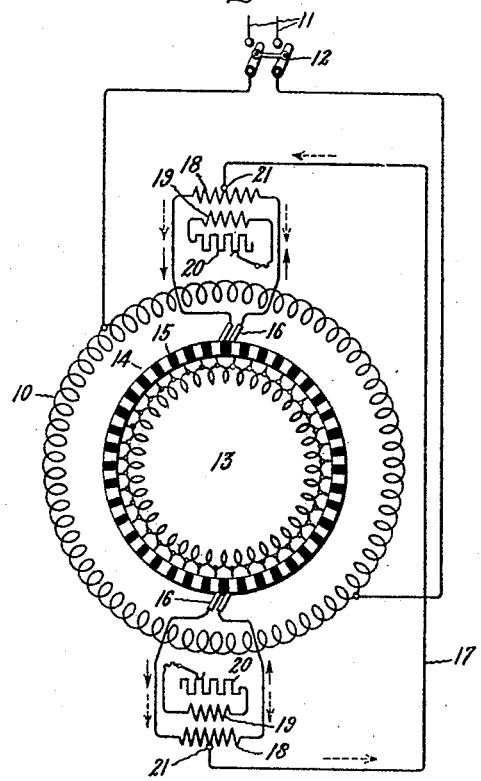

March 29, 1927.

C. MACMILLAN 1,622,596

ALTERNATING CURRENT COMMUTATOR MACHINE

Filed Nov. 8. 1924

Inventor:
Campbell Macmillan,
by
His Attorney.

Patented Mar. 29, 1927.

1,622,596

UNITED STATES PATENT OFFICE.

CAMPBELL MACMILLAN, OF SCHENECTADY, NEW YORK, ASSIGNOR TO GENERAL ELECTRIC COMPANY, A CORPORATION OF NEW YORK.

ALTERNATING-CURRENT COMMUTATOR MACHINE.

Application filed November 8, 1924. Serial No. 748,764.

My invention relates to alternating current dynamo-electric machines of the commutator type and in particular to a novel arrangement of improving the commutation of such machines.

In the usual dynamo-electric machines of the commutator type, coils of the armature are short circuited by the brushes when the brushes bridge different commutator segments. Any potential energy existing in a coil thus short circuited is dissipated by causing a short circuited current to flow through the coil to the commutator segments and through the bridge furnished by the brush or brushes, thereby causing sparking, heating and losses. This detrimental action is more pronounced in alternating current commutator machines because here the short circuited coil is subject to an alternating field. Even when the armature is stationary, there usually exists an appreciable electromotive force between the terminals of each coil under the brushes due to the "transformer" action of the field flux, the field acting as the primary and the short circuited armature coils as the secondary of a transformer.

Various arrangements have been proposed for preventing or eliminating the detrimental effects of such short circuit currents; for example, in United States Letters Patent 851,828 to McAllister there is described a commutating arrangement where it is proposed to use three brushes instead of one for leading the current to or from the armature, the three brushes being spaced apart on the circumference of the commutator with the two outer brushes connected together through a reactance and with the external circuit connection to the middle point of the reactance and to the middle brush. The brushes are of less width than the insulation between commutator segments so that any short circuited current must flow through reactance. It will be evident that this arrangement places two reactances in series in the short circuited path, one reactance comprising the armature coil, and while this tends to reduce the magnitude of the short circuit current, it also tends to prolong it. It would be more desirable, in so far as the short circuited current is concerned, to replace the external reactance with a resistance but this has the undesirable result of placing resistance in the main armature circuit.

I have discovered that by a somewhat simpler arrangement, using two commutator brushes instead of three, a resistance effect may be inserted in the short circuited path without its having any serious resistance effect on the main armature circuit and in these respects, my invention constitutes an improvement over that proposed by McAllister.

In carrying my invention into effect, I use two brushes slightly spaced apart and of slightly less width than the insulation between commutator segments. These brushes are connected together through an impedance device high in resistance as compared with its reactance. I may connect the brushes through the primary winding of a small transformer and the armature circuit to the middle point of this winding. The secondary circuit of the transformer will then contain a suitable resistance and furnish the resistance effect which is desirable in the short circuited path. The main armature current in flowing to and from the armature is substantially unimpeded, since during the greater portion of the time it divides and flows non-inductively in opposite directions through equal sections of the same coil.

The features of my invention which are believed to be new and patentable will be pointed out in the claims appended hereto. For a better understanding of my invention, reference is made in the following description to the accompanying drawing in which Fig. 1 represents the preferred arrangement for carrying out my invention and Figs. 2 and 3 show different positions of the brushes.

Referring to Fig. 1 of the drawing, 10 represents the field winding of an alternating current dynamo-electric machine of the commutator type. This winding, which is represented as being of the single phase distributed type, is connected to a suitable source of supply 11 through a switch 12. The relatively rotatable armature winding 13 is connected to a commutator 14 having relatively wide insulation segments 15 between active segments. The relatively stationary current collecting devices comprise pairs of brushes 16. The brushes on diametrically opposite sides of the commutator are short circuited by the connection 17 and thus represent a well known connection for a single phase, 2-pole, repulsion motor, although the invention is by no means limited to such a machine or connection. The brushes of each pair are of slightly less width than the insulation between commutator segments to prevent a direct short circuit of the armature coils and the brushes are slightly spaced apart as represented. The two brushes of each pair are connected together through the primary winding 18 of a small transformer. The secondary of the transformer 19 contains a resistance 20 which may be adjustable as represented where that is desirable. The external armature connection 17 is connected to the middle points 21 of the primary windings of the transformers and where the armature is directly excited from an external source, the line connections will be attached at these points.

It will be evident that any short circuit flowing between adjacent commutator segments short circuited by the pairs of brushes will flow through the primary winding of the transformer in the manner indicated by the full line arrows. This current will be alternating in character and produce a definite transformer action and a current in the secondary 19 where the major portion of the energy is dissipated in the resistance 20 without tending to prolong the flow as would be the case in a more nearly pure reactance circuit. Moreover, such current is reduced to a value where it is not injurious. For the brush position represented in Fig. 1 the main armature current will flow in the manner indicated by the dotted line arrows; that is, noninductively to or from the middle points 21 of the transformers and will produce no transformer effect whatever, since the flux set up by this current in one-half of the transformer is opposed by an equal and opposite flux in the other half of the transformer.

Figure 2:
Figure 3:

In Fig. 2 the commutator has advanced to the position where the circuit through one brush is interrupted for an instant and all the main armature current flows through one brush and one-half of the transformer primary. Under this condition, the main armature current does not flow noninductively and does produce some transformer action. However, the impedance effect produced by transformer action at this instant is very small as compared to the impedance of the main armature circuit and the loss is insignificant. Furthermore, this small energy loss is not dissipated at the brushes, but in the secondary resistance circuit of the transformer where the heating effect does no damage. Since no bridging of adjacent commutator segments occurs at the brushes with this arrangement, the brushes may be made of a material of lower resistance and consequently the resistance drop at the brushes, usually present where high resistance carbon brushes are used, may be reduced and this economy offsets the small loss in the transformer secondary.

In Fig. 3 the commutator has advanced to a position where both brushes bear upon the same commutator segment and the main current flow is again noninductive with no armature coil short circuited.

In accordance with the provisions of the patent statutes, I have described the principle of operation of my invention, together with the apparatus which I now consider to represent the best embodiment thereof; but I desire to have it understood that the apparatus shown and described is only illustrative and that the invention may be carried out by other arrangements.

What I claim as new and desire to secure by Letters Patent of the United States is:—

1. In combination, a dynamo-electric machine having a commutator composed of alternate live and dead segments, a plurality of separately insulated brushes spaced apart so as to bridge consecutive live commutator segments at the points of commutation of said commutator, a transformer having its primary winding connected between said brushes and a non-inductive resistance connected in the secondary circuit of said transformer.

2. In combination, an alternating current machine having a commutator with relatively wide spacing between its active segments, a pair of brushes each of less width than said spacing spaced apart so as to bridge consecutive active segments on said commutator at the points of commutation thereof, a transformer having its primary winding connected between said brushes and an adjustable non-inductive resistance connected across the secondary winding of said transformer.

3. In combination an alternating current dynamo-electric machine having a commutator with relatively wide spacing between its active segments, a pair of low resistance brushes spaced apart so as to bridge consecutive active commutator segments at the commutation points of said commutator, a transformer having a primary winding connected between said brushes, a non-inductive resistance connected in the secondary of said transformer and an external armature connection at the middle point of the primary of said transformer.

In witness whereof, I have hereunto set my hand this 7th day of November, 1924.

CAMPBELL MACMILLAN.